United States Patent
Oyama

(10) Patent No.: US 6,997,498 B2
(45) Date of Patent: Feb. 14, 2006

(54) SEAT DEVICE FOR VEHICLE

(75) Inventor: Rikiya Oyama, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/890,667

(22) Filed: Jul. 14, 2004

(65) Prior Publication Data

US 2005/0017532 A1    Jan. 27, 2005

(30) Foreign Application Priority Data

Jul. 23, 2003  (JP) ............................. 2003-278598
Jul. 23, 2003  (JP) ............................. 2003-278599

(51) Int. Cl.
*B60N 2/12*   (2006.01)
*B60N 2/30*   (2006.01)

(52) U.S. Cl. ............................. 296/65.05; 296/65.01; 296/64; 296/65.13; 297/15

(58) Field of Classification Search ................. 296/64, 296/65.01, 65.05, 65.09, 65.13, 37.14, 37.16; 297/15, 257, 334, 378.1
See application file for complete search history.

(56) References Cited

U.S. PATENT DOCUMENTS

| | | | | |
|---|---|---|---|---|
| 1,062,010 A | * | 5/1913 | Jacobson ..................... | 297/15 |
| 4,846,520 A | * | 7/1989 | Acuto et al. ............... | 296/65.09 |
| 5,570,931 A | * | 11/1996 | Kargilis et al. ........ | 297/378.12 |
| 6,000,742 A | * | 12/1999 | Schaefer et al. ......... | 296/65.09 |
| 6,012,755 A | * | 1/2000 | Hecht et al. .............. | 296/65.03 |
| 6,123,380 A | * | 9/2000 | Sturt et al. ................ | 296/65.09 |
| 6,193,297 B1 | * | 2/2001 | Vandermolen ............. | 296/68.1 |
| 6,234,553 B1 | * | 5/2001 | Eschelbach et al. ...... | 296/65.14 |
| 6,435,589 B1 | * | 8/2002 | Shimizu et al. .......... | 296/65.09 |
| 6,582,003 B1 | * | 6/2003 | Fourrey et al. ............... | 296/64 |
| 6,595,587 B1 | * | 7/2003 | Konishi et al. ............. | 297/331 |
| 6,601,900 B1 | * | 8/2003 | Seibold .................... | 296/65.09 |
| 6,629,721 B1 | * | 10/2003 | Macey ........................ | 297/15 |
| 6,793,265 B1 | * | 9/2004 | Kamida et al. ............... | 296/64 |
| 6,820,913 B1 | * | 11/2004 | Macey et al. ............ | 296/65.13 |
| 6,869,138 B1 | * | 3/2005 | Rhodes et al. ................ | 297/15 |

FOREIGN PATENT DOCUMENTS

| | | |
|---|---|---|
| JP | 2000-108745 | 4/2000 |
| JP | 2001-047911 | 2/2001 |
| JP | 2001-347864 | 12/2001 |

* cited by examiner

*Primary Examiner*—Patricia L. Engle
*Assistant Examiner*—Greg Blankenship
(74) *Attorney, Agent, or Firm*—Rankin, Hill, Porter & Clark LLP

(57) ABSTRACT

A seat device for a vehicle of the present invention includes a rail, a seat, a front leg, and a rear leg. The seat is made movable between a first position in which a seat cushion is supported on a lower floor via the front leg and the rear leg, and a second position in which the rear leg is disengaged from the lower floor and pivoted toward the seat cushion, a front portion of the seat cushion is supported on the lower floor via the front leg, and a rear portion of the seat cushion is supported on an upper floor.

11 Claims, 5 Drawing Sheets

SEAT DEVICE FOR VEHICLE

BACKGROUND OF THE INVENTION

Priority is claimed on Japanese Patent Application No. 2003-278598, filed Jul. 23, 2003, and Japanese Patent Application No. 2003-278599, filed Jul. 23, 2003, the contents of which are incorporated herein by reference.

1. Field of the Invention

The present invention relates to a seat device for a vehicle.

2. Description of Related Art

For recreational vehicles, etc., various seat arrangements are used to improve convenience. For example, in the case in which a seat is positioned at a boundary location between a lower floor and an upper floor which is higher than the lower floor, a seat device for a vehicle having foldable front legs provided below a front part of a seat cushion and connected on the lower floor, and a hook provided below a rear portion of the seat cushion so that the hook can be engaged to or disengaged from a joining part on the upper floor, is disclosed (for example, refer to Japanese Unexamined Patent Application, First Publication No. 2000-108745, and Japanese Unexamined Patent Application, First Publication No. 2001-47911). This seat can be stored on the lower floor by rotating the front legs after disconnecting the hook from the joining part when the seat is folded.

The car seat devices disclosed in the above documents can provide flattening of the seat in relation to the upper floor located at the backside of the seat, by folding and moving down the seat on the lower floor when the seat is unused. However, the seat device for a vehicles has low flexibility when the seat is in use, that is, when occupants are seated.

As described above, some recreational vehicles, etc., have a storable seat which is normally stored in a storage concavity below a floor, and is pulled out from the concavity for an occupant to sit on when the storable seat is needed. Some of these storable seats have foldable front legs and rear legs provided below a seat cushion, and an arm provided between a rear portion of the seat cushion and a front part of the storage concavity. The storable seat is stored in the storage concavity in a condition in which the front legs and rear legs are folded. Furthermore, the storable seat is drawn to the outside of the concavity by rotating it via the arm, and then is installed on the floor by opening the front legs and rear legs (for example, refer to Japanese Unexamined Patent Application, First Publication No. 2001-347864).

The storable seat disclosed in the same document can easily change its position between in the useable position and the unused position because the storable seat is drawn outside the storage concavity by rotating it via the arm and is installed on the floor outside the storage concavity. However, the storable seat has a problem in that the storable seat cannot use space effectively when it is in use because the storable seat cannot be used without a space outside the storage concavity.

The present invention has a purpose of providing a seat device for a vehicle having high flexibility when a seat is in use, that is, when occupants are seated, and can provide further improvement in convenience.

The present invention also has a purpose of providing a seat device for a vehicle which can easily change it position between in the useable position and in the unused position, and can use space effectively when it is in the useable position.

SUMMARY OF THE INVENTION

A seat device for a vehicle having a lower floor and an upper floor that is disposed higher than the lower floor, the seat device of the present invention includes: a rail provided on the lower floor, along a longitudinal direction of the vehicle; a seat including a seat cushion having a front portion and a rear portion; a front leg, an end of which is pivotably connected to the front portion of the seat cushion, and the other end of which is made movable along the rail; and a rear leg, an end of which is pivotably connected to the rear portion of the seat cushion, and the other end of which is disengageably connected to the lower floor, wherein the seat is made movable between a first position in which the seat cushion is supported on the lower floor via the front leg and the rear leg, and a second position in which the rear leg is disengaged from the lower floor and pivoted toward the seat cushion, the front portion of the seat cushion is supported on the lower floor via the front leg, and the rear portion of the seat cushion is supported on the upper floor.

According to the seat device for a vehicle, the seat device for a vehicle can be used in both of: the first position in which the front portion of the seat cushion is supported by the front leg rising on a front location of the rail on the lower floor, and the rear portion of the seat cushion is supported by the rear leg rising on the lower floor; and the second position in which the front part of the seat cushion is supported by the front leg rising on a rear position of the rail on the first floor, and the rear portion of the seat cushion is supported on the upper floor in a condition in which the rear leg is disconnected from the lower floor and is folded.

Therefore, even when the first seat is positioned at a boundary location between the lower floor and upper floor, the seat cushion will be useable, that is, an occupant can sit the seat cushion by changing the position forward and backward.

Therefore, it is possible to provide high flexibility when the seat cushion is in a useable position, that is, when occupants are seated, and further improvement in the convenience.

The seat device for a vehicle may include a slider which moves along the rail, wherein one end of the front leg is pivotably connected to the slider, while another end is pivotably connected to the seat cushion.

In this case, the seat cushion can be moved down on the lower floor by folding the front leg toward the seat cushion side, rotating the front leg in relation to the slider, from the state in which the seat cushion is in the backward-use-position in which: the front part of the seat cushion is supported by the front leg rising on the rear position of the rail; and the rear leg is disconnected from the lower floor and is folded; and the rear end of the first seat is supported on the upper floor.

Therefore, the seat cushion can be flat in relation to the upper floor by folding and moving down the seat cushion on the lower floor when the seat cushion is unused.

The seat device for a vehicle may further include: a concavity formed on the upper floor; and a storable seat which is folded in the concavity when the storable seat is unused, and is drawn to a space above the concavity when the storable seat is in use.

In this case, both of the seat and storable seat becomes useable by drawing the storable seat upward from the concavity on the upper floor when the seat is in the first position in which: the front part of the seat cushion is supported by the front leg rising on the front location of the rail; and the rear part of the seat cushion is supported by the rear leg rising on the lower floor.

Another seat device for a vehicle having a lower floor and an upper floor that is disposed higher than the lower floor, the another seat device of the present invention includes: a concavity formed on the upper floor; at least a pair of link arms crossing and rotatably connected to each other, which is supported on the concavity; and a second seat cushion supported on the pair of link arms.

This seat device for a vehicle adopts a storable seat having the pair of link arms crossing and rotatably connected to each other, of which each one ends supports a lower surface of the second seat cushion, while each another ends is supported on the concavity. Therefore, this storable seat becomes useable by lifting the second seat cushion up above the concavity by raising the pair of link arms. On the other hand, the storable seat is stored in the concavity by lowering the second seat cushion by lowering the pair of link arms. In this way, the storable seat can easily change its positions between the useable position and the unused position by guiding the second seat cushion by the pair of link arms. Furthermore, the storable seat can use a space effectively when it is in the useable position because the storable seat is lifted up above the concavity when it is in use. In addition, as the concavity is provided on the upper floor located back side of the lower floor, a step height can be secured by the height of the upper floor. Therefore, the height of the second seat cushion in the useable position can be low, and as a result, the link arms can be smaller.

One end of one link arm of the pair of link arms, supported on the lower floor side in the concavity, may be connected to the concavity so that the one link arm rotates along a longitudinal direction of the vehicle.

In this case, when the pair of link arms is raised from the concavity, as the one link arm is rotatably joined to a front position in the concavity, the pair of link arms approaches the front side of the concavity. Therefore, as the storable seat can be located above the front position side of the concavity, for example, in the case in which a tailgate is located behind the storable seat in the useable position, the storable seat can avoid interference with the tailgate.

Another end of the one link arm may be joined to the second seat cushion so that the one link arm rotates along a longitudinal direction of the vehicle, and one end and another end of another link arm of the pair of link arms, may be each joined to the second seat cushion and the concavity so that each of the one end and the another end moves along the longitudinal direction of the vehicle.

In this case, when the pair of link arms is raised from the concavity, the one link arm is raised centering on a joint point located on the front position in the concavity, and the second seat cushion of which the another end of the one link arm is joined to the rear part is raised upward.

In this case, at the another link arm, each of the one end slidably joined to the front part of the second seat cushion back and forth and the another end slidably joined to the rear part of the concavity back and forth, reciprocates by sliding back and forth. Therefore, when the position of the second seat cushion is changed between the raised position and the lowered position, removal operations and setup operations, etc., of a part of the storable seat becomes unnecessary. Therefore, the storable seat can change the position between the useable position and the stored position more easily.

The seat device for a vehicle may further include: a rail provided on the lower floor, along a longitudinal direction of the vehicle; a seat including a seat cushion having a front portion and a rear portion; a front leg, an end of which is pivotably connected to the front portion of the seat cushion, and the other end of which is made movable along the rail; and a rear leg, an end of which is pivotably connected to the rear portion of the seat cushion, and the other end of which is disengageably connected to the lower floor, wherein the seat is made movable between a first position in which the seat cushion is supported on the lower floor via the front leg and the rear leg, and a second position in which the rear leg is disengaged from the lower floor and pivoted toward the seat cushion, the front portion of the seat cushion is supported on the lower floor via the front leg, and the rear portion of the seat cushion is supported on the upper floor.

In this case, the seat device for a vehicle can be used in both of: the first position in which the front portion of the seat cushion is supported by the front leg rising on a front location of the rail on the lower floor, and the rear portion of the seat cushion is supported by the rear leg rising on the lower floor; and a backward-use-position in which the front part of the seat cushion is supported by the front leg rising on a rear position of the rail on the first floor, and the rear portion of the seat cushion is supported on the upper floor in a condition that the rear leg is disconnected from the lower floor and is folded. Therefore, the first seat can be used, that is, the first seat can accept an occupant by changing the position back and forth, while the first seat is positioned on a boundary location between the lower floor and upper floor. In addition, when the storable seat is in use, the seat cushion is dislocated from a space above the concavity by locating the seat cushion in the first position. When the storable seat is unused, the seat cushion can be used in both of the first position, and the second position in which the seat cushion is supported above the concavity. Therefore, it is possible to obtain high flexibility when the seat (the first seat cushion) is in use (that is, when occupants are seated), and further improvement in the convenience.

DETAILED DESCRIPTION OF THE INVENTION

An embodiment of a seat device for a vehicle according to the present invention will be explained below with reference to figures.

Figure 1:
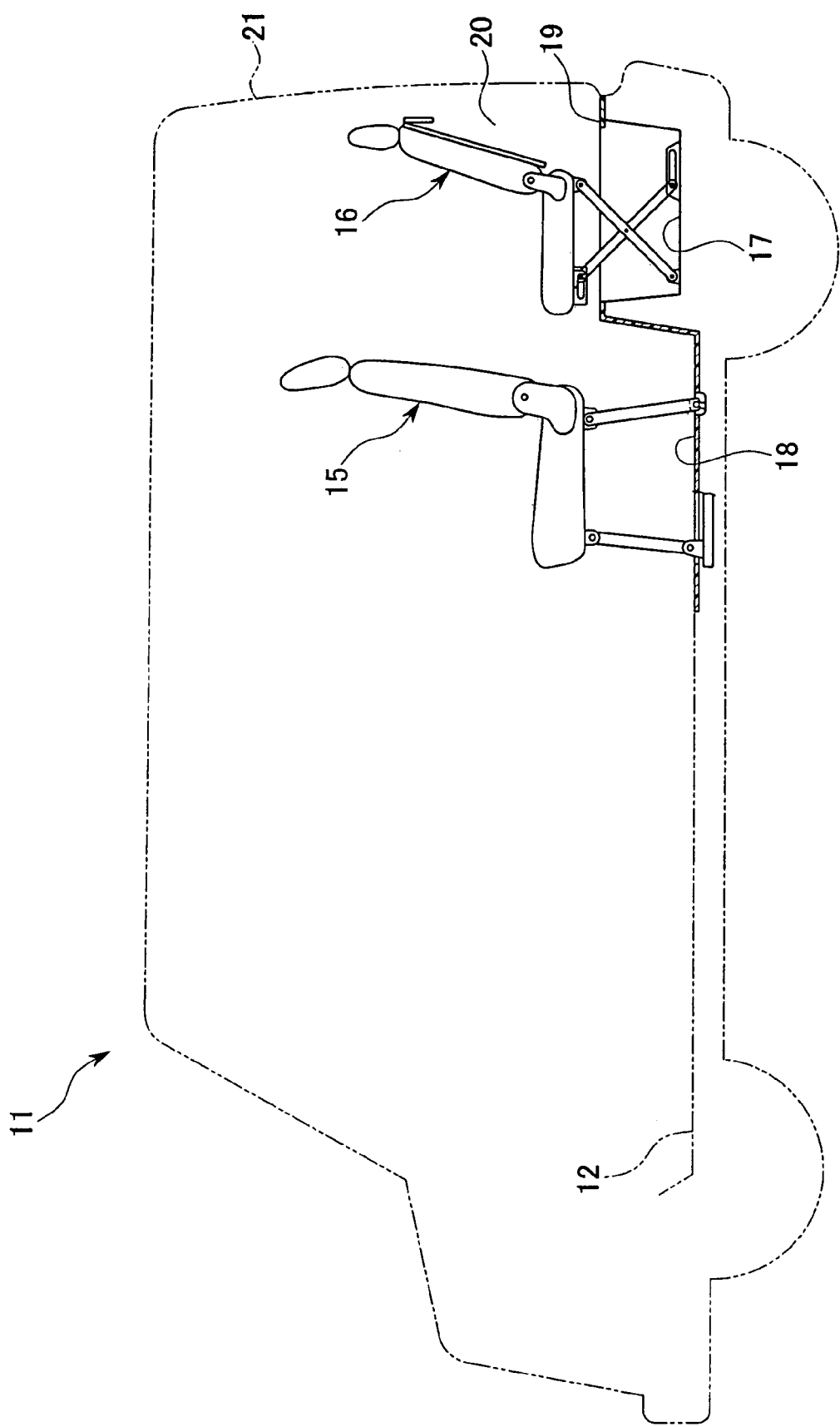
FIG. 1 shows a side sectional view of a vehicle having a seat device for a vehicle according to a first embodiment of the present invention.

FIG. 1 shows a seat device for a vehicle 11 according to the embodiment of the present invention. The vehicle 11 is a two-box type vehicle. The vehicle 11 has a seat arrangement including a front row seat (a front side seat) 15 arranged on a floor 12, and a storable seat 16 arranged behind the front row seat 15 and being storable in a storage concavity 17 on the floor 12.

Firstly, the front row seat 15 will be explained.

Figure 2:
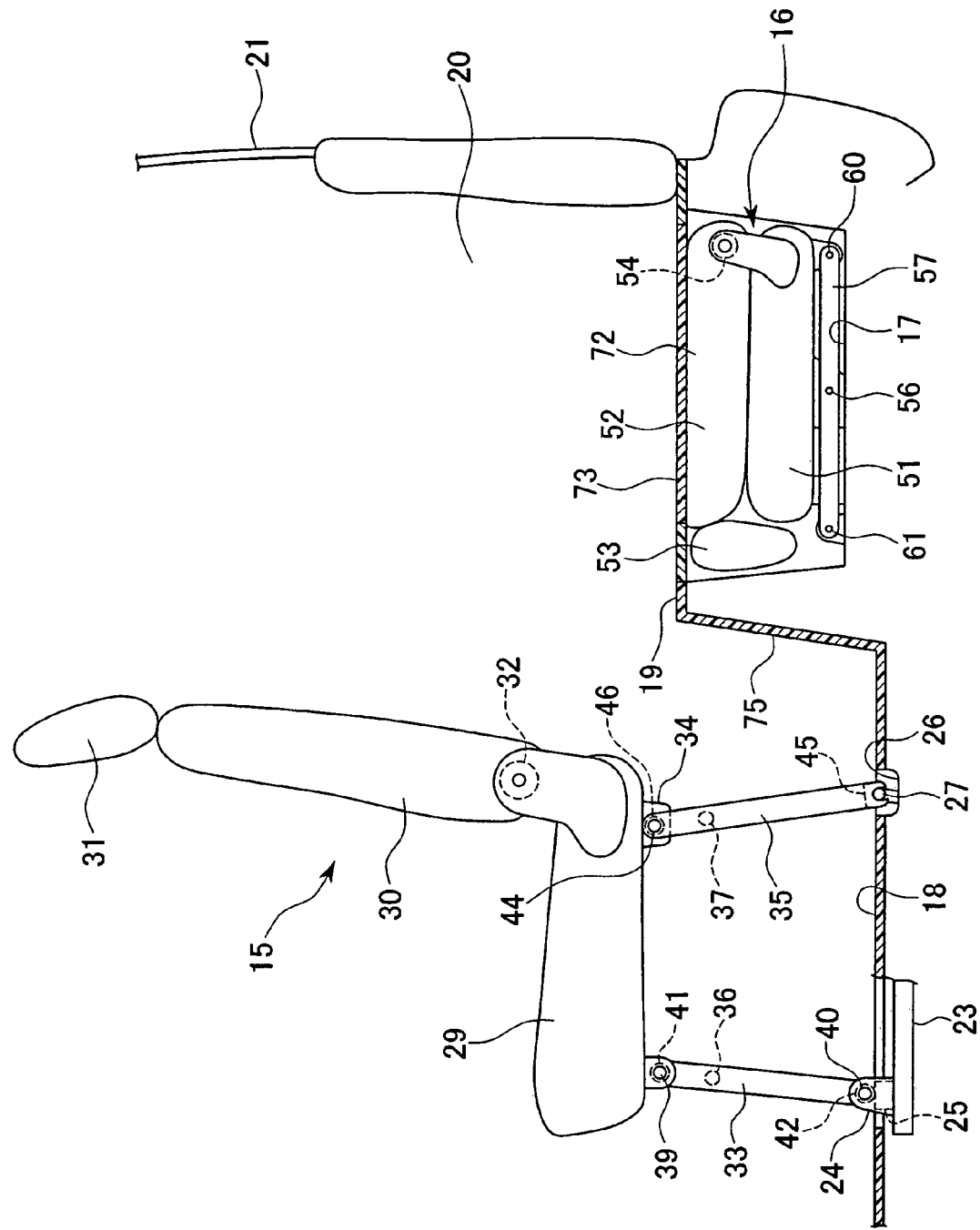
FIG. 2 shows a cross sectional view of the same seat device for a vehicle in which a front seat is in a forward-use-position (a first position), while a storable seat is in a stored position.

As shown in FIG. 2, a lower floor 18 on which the front row seat 15 is mounted, is connected to an upper floor 19 which is located behind the lower floor 18 and is also located higher than the lower floor 18. The space above the upper floor 19 forms a cargo space 20. An openable and closable tail gate 21 is provided behind the upper floor 19.

A pair of left-and-right rails 23 is mounted on the lower floor 18 extending along a forward-and-backward direction (a longitudinal direction of the vehicle) so that the positions along the forward-and-backward direction of the rails 23 meet each other. On these rails 23, sliders 24 each slidable along the forward-and-backward direction are provided. The sliders 24 can be fixed on a predetermined forward position and on a predetermined backward position of the rails 23 by a slide locking mechanism 25. The slide locking mechanism 25 automatically fixes the sliders 24 when the sliders 24 reach the predetermined forward position or the predetermined backward position, and the fixation of the sliders 24 can be released by a hand operation of an operation member (not shown in the figures).

On the lower floor 18, a pair of left-and-right concavities 26 indented downward is formed on the middle position of the rails 23 along the forward-and-backward direction so that the positions of the concavities 26 along the forward-and-backward direction meet each other.

Although not shown in the figures, each of the pair of concavities 26 is positioned outside the left and right of the pair of rails 23. Strikers (joining part) 27 are each fixed inside the concavities 26. These pair of left-and-right strikers 27 is also fixed on the lower floor 18 so that the positions of the strikers 27 along the forward-and-backward direction meet each other. Each of the strikers 27 has an upside down U-shape which is formed by left and right rods each rising from a bottom face of the concavity 26, and then are connected to each other at the top ends.

The front row seat 15 includes a seat cushion 29 that primarily supports the buttocks of an occupant, a seat back 30 that stands upright at a rear end side of the seat cushion 29 to primarily support the back of the occupant, and a headrest 31 provided on opposite side of the seat back 30 with respect to the seat cushion 29 to primarily support the back of the head of the occupant. The seat back 30 is foldable by tilting it on the seat cushion 29. The headrest 31 also tilts on the seat cushion 29. The seat back 30 is fixable in an arbitrary forward tilting angle by a reclining mechanism 32. The fixation by the reclining mechanism 32 can be released by a hand operation of an operation member, which is not shown in the figures.

A pair of left-and-right front legs 33 is attached below the front part of the seat cushion 29 of the front row seat 15. In addition, a pair of left-and-right rear legs 33 is attached to a mount portion 34 located below the seat cushion 29 of the front row seat 15. The pair of left-and-right front legs 33 is connected to each other via a connection member 36 extending along the width direction of the vehicle to form one unit. The pair of left-and-right rear legs 35 is connected to each other via a connection member 37 to form one unit.

One end of the front legs 33 are rotatably joined to the front part of the seat cushion 29 via a joining shaft 39 extending along the width direction (left-and-right direction) of the vehicle. In addition, the another end of the front legs 33 are rotatably joined to the slider 24 on the lower floor 18 via a joining shaft 40 extending along the width direction of the vehicle. The front legs 33 are automatically fixed in relation to the seat cushion 29 by a rotation locking mechanism 41 when an angle between the front legs 33 and the seat cushion 29 reaches a predetermined angle. The fixation by the rotation locking mechanism 41 can be released by a hand operation of an operation member which is not shown in the figures. The further rotation of the front legs 33 from the predetermined angle in relation to the slider 24 is inhibited by a rotation regulating mechanism 42. The fixation by the rotation regulating mechanism 42 can be released by a hand operation of an operation member which is not shown in the figures. The front legs 33 can be folded toward the seat cushion 29 by rotating the front legs 33 with respect to the seat cushion 29.

One ends of the rear legs 35 are rotatably joined to the mount portion 34 located at a rear portion of the seat cushion 29 via a joining shaft 44 extending along the width direction of the vehicle. In addition, the another ends of the rear legs 35 are detachably joined to the strikers 27 on the lower floor 18. The rear legs 35 can be fixed to the strikers 27 by a locking mechanism 45. The locking mechanism 45 can be automatically fixed to the strikers 27 by pushing the locking mechanism 45 from the above of the locking mechanism 45 onto the strikers 27. Furthermore, the fixation of the locking mechanism 45 can be released by a hand operation of an operation member which is not shown in the figures. The rear legs 35 are automatically fixed to the seat cushion 29 by a rotation locking mechanism 46 when an angle between the front legs 33 and the seat cushion 29 reaches a predetermined angle. The fixation by the rotation locking mechanism 46 can be released by a hand operation of an operation member which is not shown in the figures. The rear legs 35 can be folded toward the seat cushion 29 by rotating the rear legs 35 with respect to the seat cushion 29.

Next, operation of the front row seat 15 having the above constitution will be explained.

For example, as shown in FIG. 2, at the front row seat 15, the front legs 33 are fixed by the rotation locking mechanism 41 in a predetermined angle with respect to the seat cushion 29 which almost extends along the horizontal plane, so that the front legs 33 extend downward from the seat cushion 29. Likewise, the rear legs 35 are fixed by the rotation locking mechanism 46 in a predetermined angle with respect to the seat cushion 29 so that the rear legs 35 extend downward from the seat cushion 29. Furthermore, the sliders 24 on which the bottom ends of the front legs 33 are joined, are fixed on a predetermined forward position on the rails 23 by the slide locking mechanism 25; and the locking mechanism 45 arranged at the bottom end of the rear legs 35 are fixed to the strikers 27. That is, the front legs 33 rising from the forward position on the rails 23 will support the front part of the seat cushion 29, and the rear legs 35 joined to the strikers 27 and rising from the lower floor 18 will support the rear part of the seat cushion 29. In this way, the seat cushion 29 will be fixed on the lower floor 18, and furthermore, the seat cushion 29 will be available for an occupant to sit on after raising the seatback 30. This position is a forward-use-position (a first position) of the front row seat 15.

Figure 3:
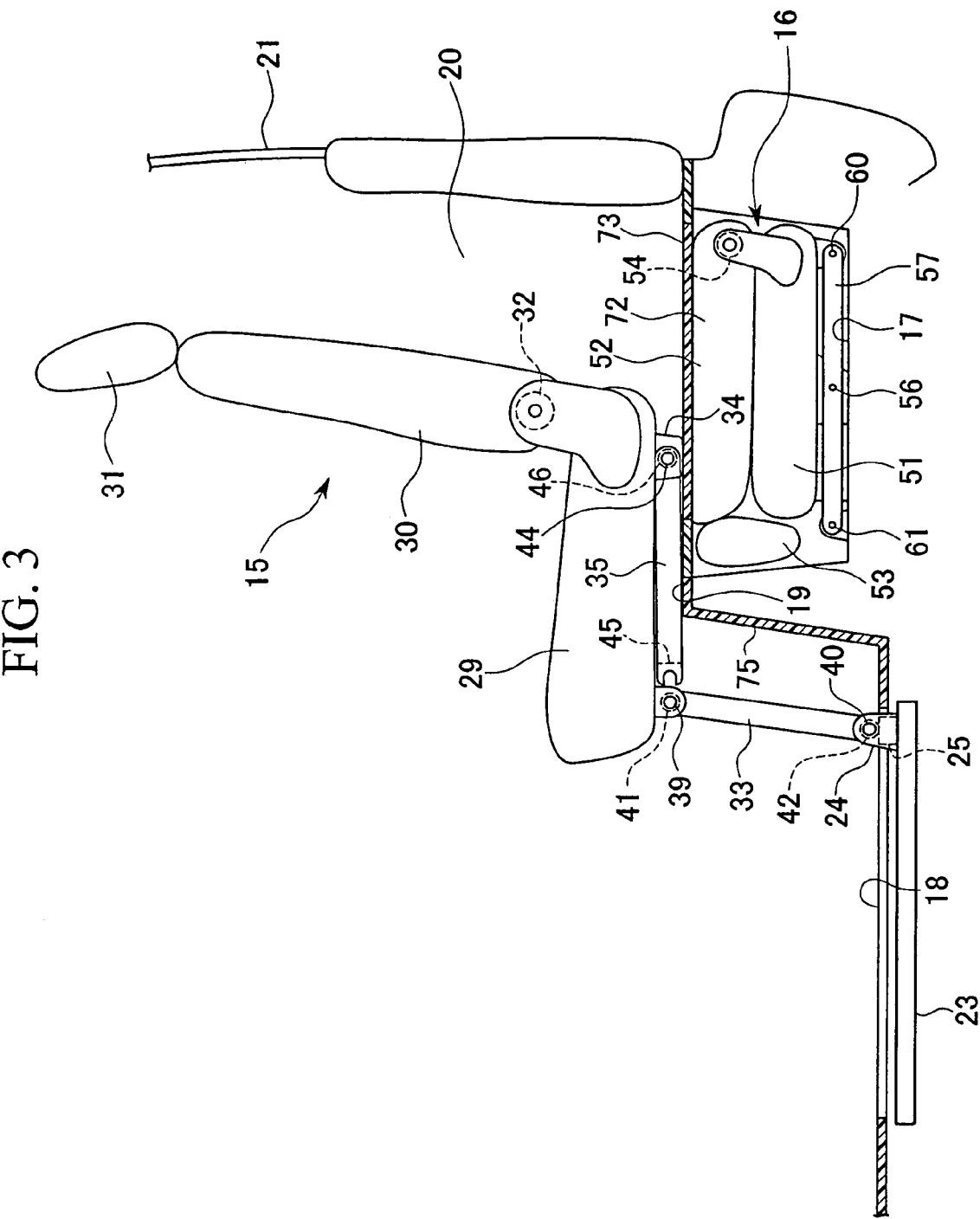
FIG. 3 shows a cross sectional view of the same seat device for a vehicle in which the front seat is in a backward-use-position (a second position) and the storable seat is in the stored position.

As shown in FIG. 3, the rear legs 35 are detached from the strikers 27 after releasing the fixation by the locking mechanism 45; the rear legs 35 are folded below the seat cushion 29 after releasing the fixation by the locking mechanism 46; and furthermore, the sliders 24 are moved along the rails 23 until the sliders 24 reach the predetermined backward position on the rails 23 and are again fixed on the rails 23, after releasing the fixation by the locking mechanism 25. Then, the front legs 33 will be held in a fixed state having a predetermined angle and position, so that the front legs 33 extend downward from the seat cushion 29 which is almost extending along the horizontal plane. The rear part of the seat cushion 29 is mounted on the upper floor 19 via the mount portion 34, with placing the folded rear legs 35 between the rear portion and the upper floor 19. That is, the frontal part of the seat cushion 29 is supported by the front legs 33 rising from the backward position on the rails 23. Furthermore, in the state in which the rear legs 35 are detached from the strikers 27 on the lower floor 18, the rear part of the seat cushion 29 is supported on the upper floor 19 which is higher than the lower floor 18. The front legs 33 in this state, are fixed to the seat cushion 29 by the rotation locking mechanism 41, and is also regulated from tilting forward with respect to the sliders 24 by the rotation regulating mechanism 42. Therefore, in this state, by raising the seat back 30, the front row seat 15 will be in a state in which the occupant can sit.

This position is a backward-use-position (a second position) of the front row seat 15. As the storage concavity 17 which stores storable seat 16 in the folded state is provided under the seat cushion 29 of the front row seat 15 in the backward-use-position, when the front row seat 15 is positioned in the backward-use-position, the storable seat 16 needs to be stored in advance (the method for storing the storable seat 16 will be described later).

Figure 4:
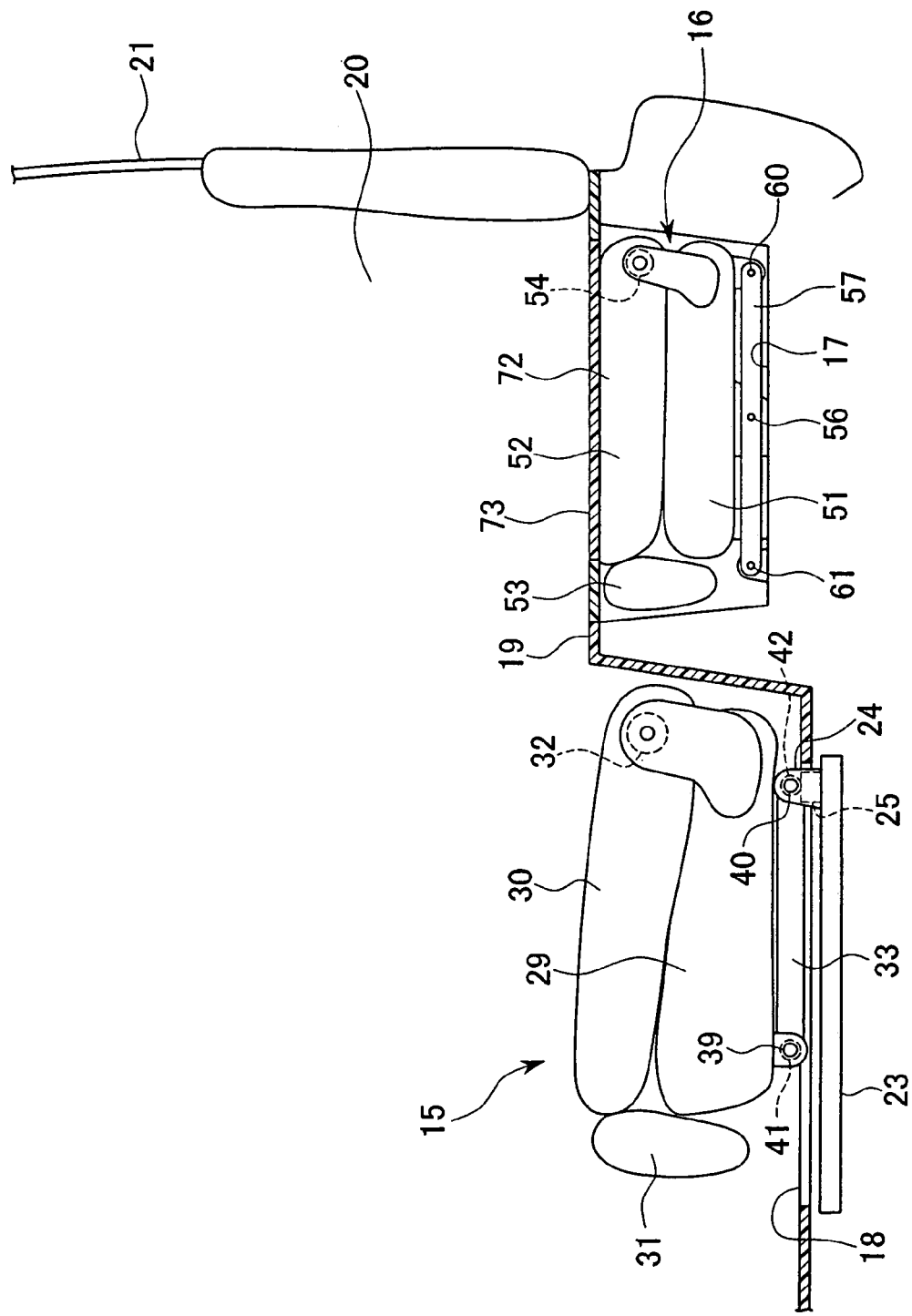
FIG. 4 shows a cross sectional view of the same seat device for a vehicle in which the front seat is moved down and the storable seat is in the stored position.

Furthermore, in the backward-use-position, the rotation regulation of the front legs 33 with respect to the sliders 24 by the rotation regulating mechanism 42, and the fixation of the front legs 33 with respect to the seat cushion 29 by the rotation locking mechanism 41, are released. Then, by rotating the front legs 33 with respect to the sliders 24 and the seat cushion 29, as shown in FIG. 4, the front row seat 15 is moved down on the lower floor 18. Furthermore, by folding the headrest 31 and by tilting the seat back 30 forward, the front row seat 15 becomes flat in relation to the upper floor 19.

Conversely to the aforementioned, by rotating the front legs 33 in relation to the sliders 24 and the seat cushion 29, and then by mounting the seat cushion 29 onto the upper floor 19 via the folded rear legs 35, the front row seat 15 will be in the backward-use-position from the state in which the front row seat 15 is moved down on the lower floor 18. From this backward-use-position, by sliding the sliders 24 until they reach the predetermined forward position, and then by opening the rear legs 35 and fixing them on the strikers 27, the front row seat 15 will be in the forward-use-position.

Next, the storable seat 16 will be explained.

As explained in the above, the storage concavity 17 indented downward is provided on the upper floor 19 which is located behind the lower floor 18 and is higher than the lower floor 18. In this storage concavity 17, the storable seat 16 is provided so that the storable seat 16 can be stored.

Figure 5:
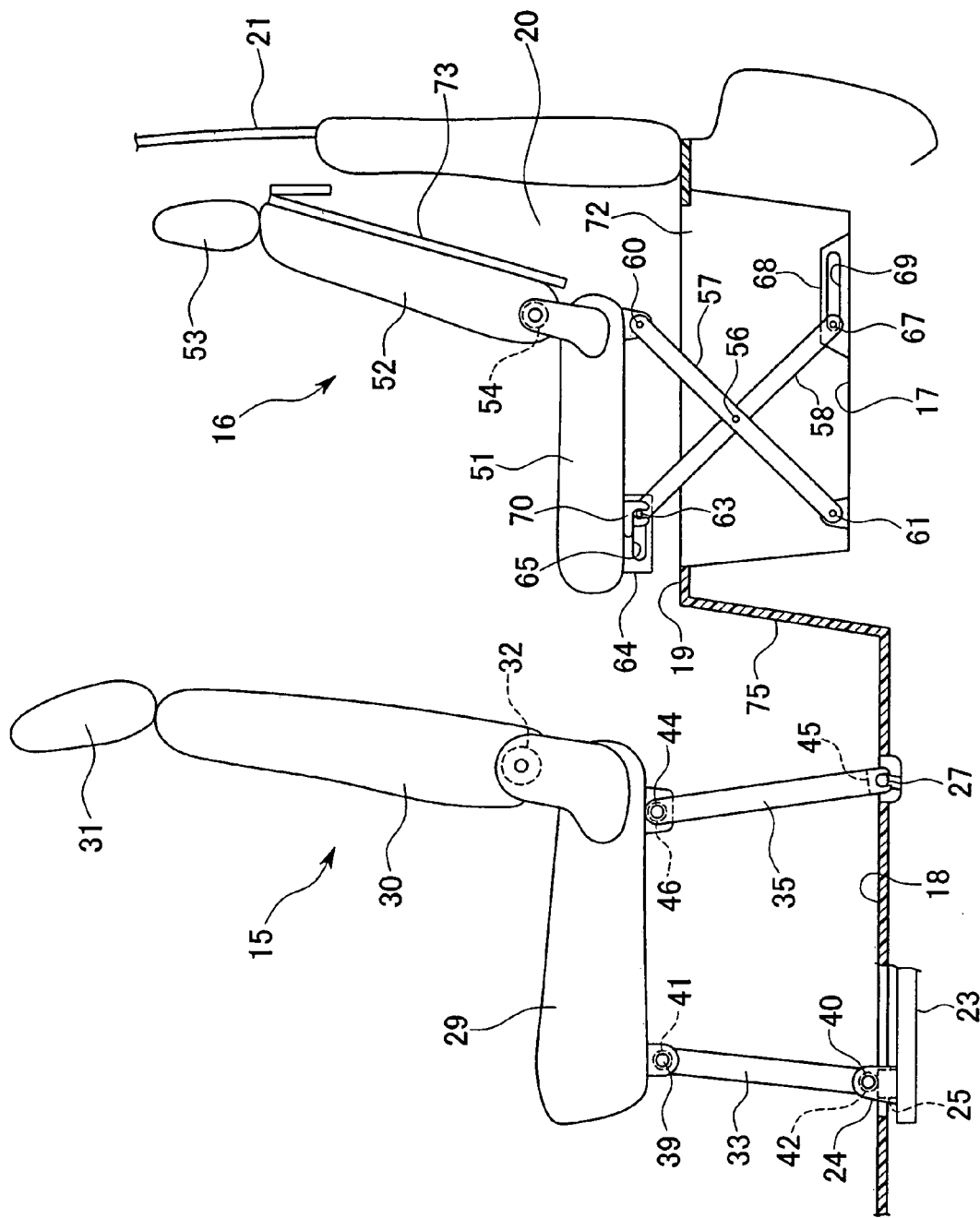
FIG. 5 shows a cross sectional view of the same seat device for a vehicle in which the front seat is in the forward-use-position (the first position) and the storable seat is in the useable position.

As shown in FIG. 5, the storable seat 16 includes a seat cushion (the second seat cushion) 51 that primarily supports the buttocks of an occupant, a seat back 52 that stands upright at a rear end side of the seat cushion 51 to primarily support the back of the occupant, and a headrest 53 provided on an opposite side of the seat back 52 with respect to the seat cushion 51 to primarily support the back of the head of the occupant. The seat back 52 is folded by tilting it on the seat cushion 51. The headrest 53 also tilts on the seat cushion 51. The seat back 52 is fixable in an arbitrary forward tilting angle by a reclining mechanism 54. The fixation by the reclining mechanism 54 can be released by a hand operation of an operation member which is not shown in the figures.

The storable seat 16 includes a pair of first link arm (link arm) 57 and second link arm (link arm) 58, which are rotatably joined to each other, so that the first link arm 57 and the second link arm 58 intersect each other, by a joining shaft 56 extending along the width direction of the vehicle and provided on the each middle portions of the first link arm 57 and the second link arm 58. Each one end sides of the first link arm 57 and the second link arm 58 is joined to the below of the seat cushion 51, and each another ends is joined to the inside the storage concavity 17. Each of the pair of first link arm 57 and second link arm 58 is provided at both left-and-right sides below the seat cushion 51.

One end of the first link arm 57 is rotatably joined to the below of the rear part of the seat cushion 51 via a joining shaft 60 extending along the width direction of the vehicle, while the another end is rotatably joined to the front part side of the bottom face in the storage concavity 17.

A slide shaft 63 provided on one end of the second link arm 58 and extending along the width direction of the vehicle, is joined to a slide guide 64 provided to the front part of the lower surface of the seat cushion 51. The slide shaft 63 can slide back and forth by sliding in a guide slit 65 formed in the slide guide 64 and extending along back and forth. A slide shaft 67 provided on the another end of the second link arm 58 and extending along the width direction of the vehicle, is joined to the slide guide 68 provided on the rear part of the bottom face of the storage concavity 17. The slide shaft 67 can slide back and forth by sliding in a guide slit 69 formed in the slide guide 68 and extending along back and forth.

The first link arm 57, the second link arm 58, the seat cushion 51, and the storage concavity 17 form a four-link mechanism. In addition, the one end side of the first link arm 57 and the seat cushion 51 are rotatably connected, the another end side of the first link arm 57 and the storage concavity 17 are rotatably connected, the one end of the second link arm 58 and the seat cushion 51 are slidably connected, the another end side of the second link arm 58 and the storage concavity 17 are slidably connected, the first link arm 57 and the second link arm 58 are rotatably connected.

A slide locking mechanism 70 is provided, for example, to the slide guide 64 provided to the seat cushion 51, which automatically fixes the second link arm 58 so that the second link arm 58 cannot move with respect to the guide slit 65 when the slide shaft 63 of the second link arm 58 is positioned to the rear end side of the guide slit 65. The fixation by the slide locking mechanism 70 can be released by a hand operation of an operation member, which is not shown in the figures.

A foldable floor member 73 is attached on the back face of the storable seat 16, which closes an opening 72 of the storage concavity 17 when the storable seat 16 is stored in the storage concavity 17, and forms one part of the upper floor 19.

Next, operation of the storable seat 16 having the above constitution will be explained.

As shown in FIG. 2, the rear part of the seat cushion 51 is positioned to the rearmost side and the lowest side when the storable seat 16 is positioned so that the first link arm 57 extends backward from a connecting shaft 61 provided in the storage concavity 17. When it is explained referring to FIG. 5, by placing the second link arm 58 so that the slide shaft 63 be positioned to the front side of a guide slit 65 of the slide guide 64 and also the slide shaft 67 be positioned to the rear side of a guide slit 69 of the slide guide 68, the seat cushion 51 will be in a position extending along the back and forth, and the front part of the seat cushion 51 will be positioned to the rearmost side and the lowest side. In this state, as shown in FIG. 2, the seat cushion 51 is stored in the storage concavity 17. Furthermore, by tilting the seatback 52 forward when the headrest 53 is in the folded position, the headrest 53 and the seatback 52 also will be stored in the storage concavity 17. At this time, by developing the floor member 73 provided on the back face of the seatback 53, the opening 73 formed to the upper part of the storage concavity 17 will be closed. This is the stored position of the storable seat 16. When the storable seat 16 is in the stored position, the front row seat 15 becomes useable in both of the forward-use-position shown in FIG. 2 and the backward-use-position shown in FIG. 3.

To set the storable seat 16 in the useable position, as shown in FIG. 2, the front row seat 15 is positioned to the forward-use-position in advance. Next, as shown in FIG. 5, the first link arm 57 and the second link arm 58 are raised. Then, the seat cushion 51 is lifted to almost just above of the storage concavity 17 while keeping the position almost extending along the horizontal direction, and then the seat cushion 51 reaches to the useable position which is above the storage concavity 17. Furthermore, by fixing the slide shaft 63 of the first link arm 57 to the slide locking mechanism 70, the seat cushion 51 becomes useable.

In this useable position, by raising the seat back 52, the storable seat 16 will be in a state in which the occupant can sit. That is, when the first link arm 57 and the second link arm 58 are raised from the storage concavity 17, the first link arm 57 is raised centering on the connecting shaft 61 positioned at the joint position on the front side of the storage concavity 17, and also the seat cushion 51 joined to the another end side of the first link arm 57 by the connecting shaft 60 located below the rear side of the seat cushion 51, is lifted upward. At the second link arm 58, each of the slide shaft 63 joined to the front part of the seat cushion 51 so that the slide shaft 63 can slide back and forth, and the slide shaft 67 connected to the rear part of the storage concavity 17 so that the slide shaft 67 can slide back and forth, reciprocates by sliding back and forth. At this time, as the first link arm 57 is rotatably joined to the joining shaft 61 arranged on the front part inside the storage concavity 17, the first link arm 57 and the second link arm 58 (that is, the storable seat 16) slightly approach the front side of the storage concavity 17. As the front end of the seat cushion 51, at this time, corresponds to the position of a wall 75 which is a boundary between the lower floor 18 and the upper floor 19, a step height can be secured by the height of the wall 75.

To store the storable seat 16, by lowering the first link arm 57 and the second link arm 58 after releasing the fixation of the slide locking mechanism 70, the seat cushion 51 is lowered slightly shifting backward, and then stored in the storage concavity 17. Furthermore, by developing the floor member 73 provided on the back face of the seat back 52 after tilting the headrest 53 and the foldable seat back 52 forward, the top opening 72 will be closed. As a result, the cargo space 20 will have a flat floor.

Moreover, by tilting the seat back 52 forward when the storable seat 16 is in the useable position, the floor member 73 provided on the back face of the seat back 52 will be in a position in which the floor member 73 is mounted on the seat back 52, thus, the storable seat 16 will be a place to place baggage even in this position.

By arranging the setting of the four-link mechanism constituted by the first link arm 57, the second link arm 58, seat cushion 52, and the storage concavity 17, it is possible to position the seat cushion 51 so that the seat side face is horizontal when the seat cushion 51 is in the stored position, while the seat face is inclined so that the front side becomes higher than the rear side when the seat cushion 51 is in the useable position.

According to the present embodiment described above, the front row seat 15 can be used in both of: the forward-use-position in which the front part of the seat cushion 29 is supported by the front legs 33 rising from the front location on the rails 23 on the lower floor 18, while the rear part of the seat cushion 29 is supported by the rear legs 35 joined to the strikers 27 on the lower floor 18 and rising from the lower floor 18; and the backward-use-position in which the front part of the seat cushion 29 is supported by the front legs 33 rising from the rear position on the rails 23 on the lower floor 18, while the rear part of the seat cushion 29 is supported by the upper floor 19 which is higher than the lower floor 18, in the state that the rear legs 35 are detached from the strikers 27 and are folded. Therefore, the front row seat 15 will be useable, that is, an occupant can sit in the front row seat 15 by changing the position of the front row seat 15 forward and backward, even when the front row seat 15 is positioned at a boundary location between the lower floor 18 and the upper floor 19. Therefore, it is possible to obtain high flexibility when the front row seat 15 is in use, that is, when occupants are seated, and further improvement in the convenience.

In addition, at the front row seat 15, the front legs 33 can be folded toward the seat cushion 29 side by rotating the front legs 33 in relation to the sliders 24 on the rails 23 from the backward-use-position in which the front part of the seat cushion 29 is supported by the front legs 33 rising from the rear position on the rails 23 on the lower floor 18, while the rear part of the seat cushion 29 is supported by the upper floor 19 which is higher than the lower floor 18, in the state in which the rear legs 35 are detached from the strikers 27 and are folded. By this, the first row seat 15 can be moved down on the lower floor 18. Therefore, the front row seat 15 can be flat with respect to the upper floor 19 behind the lower floor 18 by folding and moving down the front row seat 15 on the lower floor 18 when the front row seat 15 is unused.

Furthermore, the storable seat 16 (which is different from the front row seat 15) can be useable by lifting the storable seat 16 from the storage concavity 17 on the upper floor 19, when the front row seat 15 is in the forward-use-position in which the front part of the seat cushion 29 is supported by the front legs 33 rising from the front location on the rails 23 on the lower floor 18, while the rear part of the seat cushion 29 is supported by the rear legs 35 joined to the strikers 27 on the lower floor 18 and rising from the lower floor 18. Therefore, both of the front row seat 15 and the storable seat 16 positioned along the longitudinal direction of the vehicle, are useable at the same time.

In addition, the present invention adopts the storable seat 16 having the pair of link arms 57 and 58 crossing and rotatably connected to each other, of which the one ends are joined to the lower surface of the seat cushion 51, while the other ends are joined to the storage concavity 17. Therefore, this storable seat 16 becomes useable by lifting the storable seat 16 above the storage concavity 17 by raising the pair of link arms 57 and 58. On the other hand, the storable seat 16 is stored in the storage concavity 17 by lowering the seat cushion 51 by lowering the pair of link arms 57 and 58. In this way, the storable seat 16 can easily change its position between the useable position and the unused position by guiding the seat cushion 51 by the pair of link arms 57 and 58. Furthermore, the storable seat 16 can use space effectively when it is in the useable position because the storable seat 16 is lifted up above (almost just above) the concavity 17 when it is in useable position. In addition, as the storage concavity 17 is provided on the upper floor 19 located back side of the lower floor 18, a step height can be secured by the height of the upper floor 19. Therefore, the height of the storable seat cushion 51 in the useable position can be low, and as a result, the link arms 57 and 58 can be smaller.

Furthermore, when the pair of link arms 57 and 58 is raised from the storage concavity 17, as the first link arm 57 is rotatably joined to the front position in the storage concavity 17, the storable seat 16 approaches the front side of the storage concavity 17. Therefore, as the storable seat 16 can be located above the front position side of the storage concavity 17, for example, in the case in which the tailgate 21 is located behind the storable seat 16 in the useable position, the storable seat 16 can avoid interference with the tailgate 21.

At the storable seat 16, when the pair of link arms 57 and 58 is raised from the storage concavity 17, the first link arm 57 is raised centering on a joint point located on the front position in the storage concavity 17, and the seat cushion 51 to which the another end of the first link arm 57 is joined at the rear part, is raised upward. At this time, at the another link arm 58, each of the one end joined to the front part of the seat cushion 51 slidably back and forth and the another end joined to the rear part of the storage concavity 17 slidably back and forth, reciprocates by sliding back and forth. Therefore, when the position of the seat cushion 51 is changed between the raised position and the lowered position, removal operations and setup operations, etc., of a part of the storable seat 16 becomes unnecessary. Therefore, the storable seat 16 can change the position between the useable position and the stored position more easily.

Moreover, the aforementioned front row seat 15 and the aforementioned storable seat 16 located back side of the front row seat 15 are useable as any row seats.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat device for a vehicle having a lower floor and an upper floor that is disposed higher than the lower floor, the seat device comprising:
   a rail provided on the lower floor, along a longitudinal direction of the vehicle;
   a seat including a seat cushion having a front portion and a rear portion;
   a front leg, a first end of which is pivotably connected to the front portion of the seat cushion, and a second end of which is made movable along the rail; and
   a rear leg, a first end of which is pivotably connected to the rear portion of the seat cushion, and a second end of which is disengageably connected to the lower floor,
   wherein the seat is made movable between a first position in which the seat cushion is supported on the lower floor via the front leg and the rear leg, and a second position in which the rear leg is disengaged from the lower floor and pivoted toward the seat cushion, the front portion of the seat cushion is supported on the lower floor via the front leg, and the rear portion of the seat cushion is supported on the upper floor.

2. The seat device for a vehicle according to claim 1, further comprising a slider which moves along the rail,
   wherein the second end of the front leg is pivotably connected to the slider.

3. The seat device for a vehicle according to claim 1, further comprising:
   a concavity formed on the upper floor; and
   a storable seat which is folded in the concavity when the storable seat is unused, and is drawn to a space above the concavity when the storable seat is in use.

4. A seat device for a vehicle having a lower floor and an upper floor that is disposed higher than the lower floor, the seat device comprising:
   a concavity formed on the upper floor;
   at least a pair of link arms crossing and rotatably connected to each other, wherein the pair of link arms are supported within the concavity; and
   a seat cushion supported on the pair of link arms, wherein:
   the pair of link arms includes a first link arm and a second link arm;
   a first end of the first link arm, supported on the lower floor side in the concavity, is connected to the concavity so that the first link arm rotates along a longitudinal direction of the vehicle;
   a second end of the first link arm is joined to the seat cushion so that the first link arm rotates along the longitudinal direction; and
   a first end of the second link arm is joined to the concavity while a second end of the second link arm is joined to the seat cushion, so that each of the first end and the second end of the second link arm move along the longitudinal direction of the vehicle.

5. The seat device for a vehicle according to claim 4, wherein said seat is a second seat, and wherein said seat cushion is a second seat cushion further comprising:
   a rail provided on the lower floor, along a longitudinal direction of the vehicle;
   a first seat including a first seat cushion having a front portion and a rear portion;
   a front leg, a first end of which is pivotably connected to the front portion of the first seat cushion, and a second end of which is made movable along the rail; and
   a rear leg, a first end of which is pivotably connected to the rear portion of the first seat cushion, and a second end of which is disengageably connected to the lower floor,
   wherein the first seat is made movable between a first position in which the first seat cushion is supported on the lower floor via the front leg and the rear leg, and a second position in which the rear leg is disengaged from the lower floor and pivoted toward the first seat cushion, the front portion of the first seat cushion is supported on the lower floor via the front leg, and the rear portion of the first seat cushion is supported on the upper floor.

6. The seat device for a vehicle according to claim 4, wherein the first link arm and the second link arm are rotatably connected to each other by a joining shaft.

7. The seat device for a vehicle according to claim 4, wherein the first end of the second link arm includes a slide shaft that is slidably connected to a slide guide provided within the concavity, wherein the slide shaft slides back and forth within the slide guide as the pair of link arms are raised and lowered.

8. The seat device according to claim 7, wherein the slide guide defines a guide slit for receiving the slide shaft, wherein the slide shaft slides back and forth within the guide slit.

9. The seat device for a vehicle according to claim 4, wherein the second end of the second link arm includes a slide shaft that is slidably connected to a slide guide provided on a bottom face of the seat cushion, wherein the slide shaft slides back and forth within the slide guide as the pair of link arms are raised and lowered.

10. The seat device according to claim 9, wherein the slide guide defines a guide slit, wherein the slide shaft slides back and forth within the guide slit.

11. The seat device according to claim 10, further comprising a releasable slide locking mechanism, provided on the slide guide, for fixing the second link arm against movement with respect to the slide guide, so as to lock the seat cushion in the use position.

* * * * *